Patented May 23, 1939

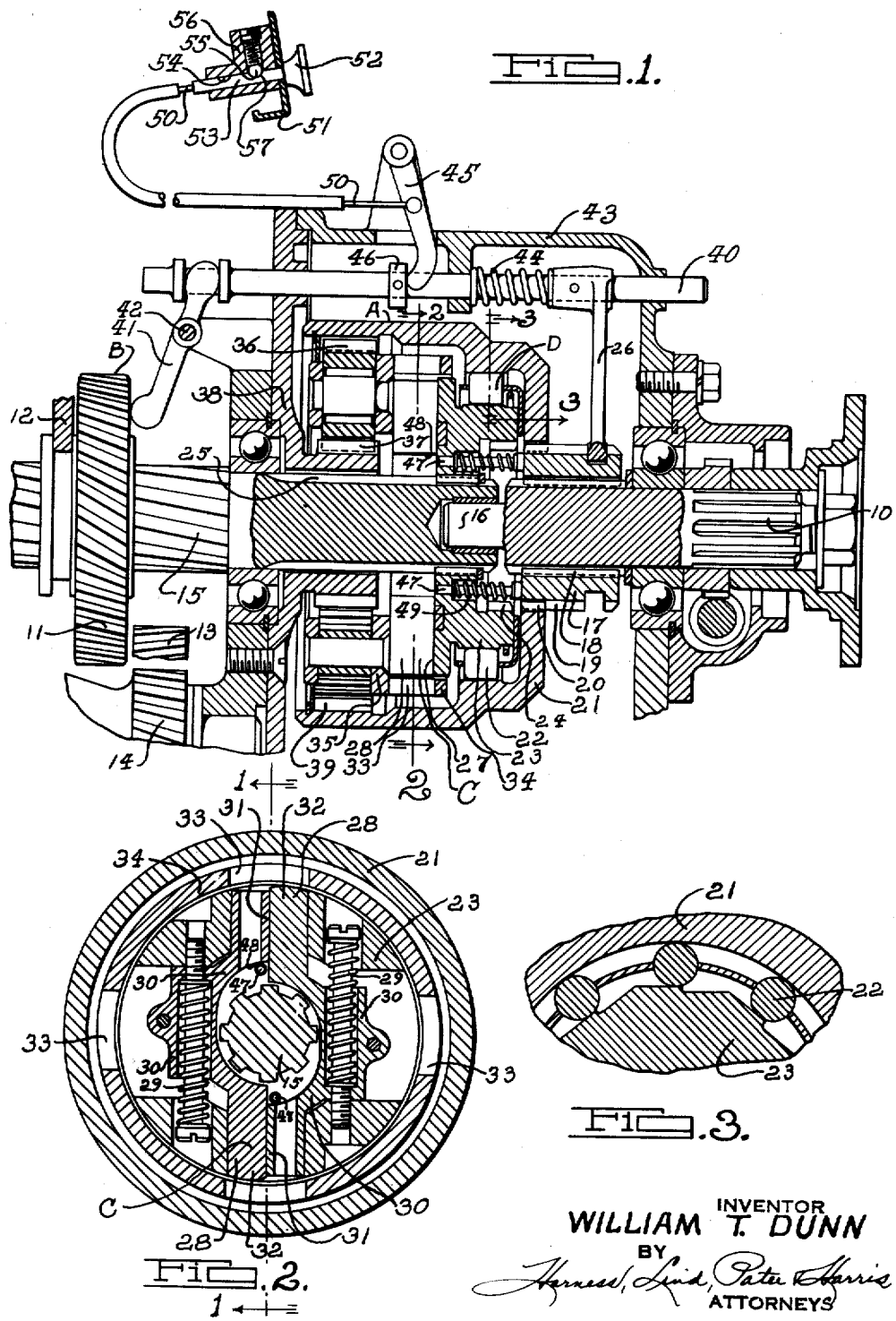

2,159,426

UNITED STATES PATENT OFFICE 2,159,426

POWER TRANSMISSION

William T. Dunn, Detroit, Mich., assignor to Chrysler Corporation, Highland Park, Mich., a corporation of Delaware Application March 6, 1936, Serial No. 67,426

9 Claims. (Cl. 74—260)

This invention relates to power transmissions especially adapted for use in driving motor vehicles and refers more particularly to improvements in speed ratio changing mechanisms in motor vehicle drives.

My invention, in its more limited aspects, refers particularly to speed ratio changing mechanism more particularly described in my co-pending application Serial No. 707,048, filed January 18, 1934.

In one of its embodiments, my invention provides improvements in automatic change speed devices and while my improvements are readily adaptable to a variety of arrangements of speed ratio gearings and gear train values, I have preferred to illustrate the principles of my invention in connection with an automatically operating overdriving mechanism employing planetary gearing.

One object of my invention is to provide improved safety controlling means for a transmission mechanism whereby improper or undesired driving conditions cannot occur or tend to take place.

A further object of my invention is to provide improved means for controlling the operation of the overdrive gearing clutch control, which is preferably of the automatic centrifugal force operated type, whereby the driving mechanism cannot be manually or otherwise operated for a direct drive between the driving and driven shafts while the drive between said shafts is through the overdrive gearing. Further, my invention preferably also includes, as a further control and protection to the transmission mechanism, means for preventing engaging operation of the centrifugal clutch to establish an overdrive, or to tend to establish such drive, while the driving mechanism is set for a direct two-way drive between said shafts.

Further objects and advantages of my invention will be more apparent hereinafter as the following detailed description of one illustrative embodiment of my invention progresses, reference being had to the accompanying drawing in which:

Fig. 1 is a sectional elevational view through my driving mechanism taken approximately on the line 1—1 of Fig. 2, and somewhat diagrammatically illustrating the manually controlled mechanism for effecting a lock-out of the overrunning and automatic clutches.

Fig. 2 is a sectional elevational view along line 2—2 of Fig. 1, illustrating the automatic clutch in its disengaged condition.

Fig. 3 is a fragmentary sectional view along the line 3—3 of Fig. 1 showing the overrunning clutch.

In the drawing, I have illustrated my driving mechanism A interposed between a speed ratio changing transmission B and a driven shaft 10, the latter extending rearwardly to drive the rear wheels (not shown) of the motor car or vehicle in the usual well-known manner, it being understood that I have elected to show my invention in association with a motor vehicle drive although my invention in its broader aspects is not necessarily limited thereto. Furthermore, my driving mechanism may be used to advantage at various other points in the line of general power transmission between the vehicle engine and the driven wheels, or between driving or driven means such as shafts of other types of devices.

The transmission B may be of any suitable type such as the conventional selector type operated in the well-known manner through usual selector controls whereby the various adjustments may be made to the transmission in order to provide speed ratios including reverse, in the line of drive through the transmission.

Inasmuch as transmission B may for the most part be of general conventional construction and operation, I have shown only a portion of the gearing of this transmission in Fig. 1 wherein 11 represents a low speed and reverse gear adapted to be shifted by the usual reverse selector control generally designated at 12, rearwardly or to the right as viewed in Fig. 1 for engagement with the usual reverse idler 13 in order to effect a reverse drive from the normal direction of drive to the driven shaft 10. This idler gear 13 constantly meshes with the usual countershaft reverse gear 14. Thus, by appropriate actuation of the usual transmission controls, gears 11 and 13 may be engaged to reverse the drive, it being understood that other manipulations of the transmission mechanism are adapted to selectively produce other desired speed ratio changes in the normal direction of rotation for driven shaft 10.

The power coming from the usual engine or other prime mover (not shown) which may be located forwardly of transmission B, drives the transmission and the power is taken from this transmission by a power driving means or shaft 15.

In Fig. 1 the driving shaft pilots the forward end 16 of driven shaft 10. A shiftable clutch 17 is slidably mounted on one of the shafts, such as shaft 10, and is continuously drivingly connected with said shaft by splines 18. This clutch 17 has teeth 19 engageable with teeth 20 of the cylindrical driven member 21 of the overrunning clutch D, the latter having cylinders 22 and driving inner cam member 23. In this instance this cam member 23 has teeth 24 and is driven from shaft 15 by splines 25 thereof, teeth 24 being engageable with teeth 19 of shiftable clutch 17 when the latter is moved forwardly by arm 26 to lock out the overrunning clutch.

Cam member 23, for convenience, may be formed with a pawl cage 27 carrying one or more pawls 28 of the automatic clutch C.

This automatic clutch may be of the type shown in my aforesaid co-pending application wherein the pawls 28 are yieldingly urged inwardly to their disengaged or declutched positions by springs 29. At a predetermined desired speed of rotation of the pawls, centrifugal force will cause outward movement of the pawls, overcoming the action of springs 29, whereby the pawls will be projected for engaged or clutched positions. Each pawl 28 may have a yoke portion 30 extending partially around shaft 15 and terminating in a counterbalancing guide end portion 31 substantially diametrically opposite the clutching end portion 32 of each pawl.

Slots 33 of shell 34 are driven by the planet carrier 35 having planet gears 36 meshing with a sun gear 37 in this case fixed by brackets 38 to the casing of transmission B. Planet gears 36 also mesh with annular internal gear 39 of the cylindrical driving member 21.

The planetary gear set is thus adapted at all times to rotate slots 33 from the driven shaft 10, through clutch 17 and member 21, at a speed less than that of the pawls 28 which are directly driven from the shaft 15. With clutch 17 positioned as in Fig. 1, shaft 15 drives shaft 10 through the overrunning clutch D until, at or above the critical speed, pawls 28 are projected outwardly for engagement with slots 33, and such engagement will occur when the slots and pawls are substantially synchronized. Prior to synchronization the pawls jump the slots, as more particularly described in my aforesaid co-pending application.

Synchronization is provided for by decreasing the speed of the driving shaft, as by releasing the usual accelerator pedal, and allowing the driven shaft to overrun the driving shaft by reason of the overrunning clutch D.

When clutch C engages for providing a two-way positive drive through the planetary gear train, the overrunning clutch is ineffective and continues to be so until the pawls are retracted by reason of their rotation below the critical speed.

A means for shifting clutch 17 forwardly has been provided by shifter arm 26 fixed to horizontal rod 40. A lever 41 is pivoted at 42, its lower face being in the path of slideable low and reverse gear 11 and its upper face being forked for joint connection to horizontal rod 40. Rod 40 is slidably mounted in a case 43 of the overdrive mechanism and is yieldingly urged rearwardly by spring 44, whenever gear 11 is not engaged for reverse drive and whenever a dash control—to be described later—is not actuated.

A further means for shifting clutch 17 has been incorporated which is independent of the aforementioned reverse gear control. An arm 45 is mounted and pivoted on case 43, its lower face engaging a sleeve 46 of rod 40, a suitable remote control—in my drawing a Bowden wire dash control—being attached to arm 45 and extending to the illustrated dash control. The details of the dash control will be presently set forth.

Lock-out of automatic clutch C is effected by forward movement of pins 47 slideable through suitable openings in cam 23 and actuated by the forwardly shifting movement of clutch 17. When these pins are projected forwardly, they engage the surfaces 48 of the pawl end portions 31 thereby preventing outward movement of the pawls 28. Springs 49 tend to return pins 47 to disengaged position following along with rearwardly shifting movement of clutch 17.

Forwardly shifting of clutch 17 is effected when gear 11 is moved to reverse drive. The lever 41 extends into the path of movement of the gear 11 when the latter is moved rearwardly for engagement with reverse idler 13 as aforesaid. The arrangement is such that when the gear is shifted into engagement with gear 13 for establishing the reverse drive, provided that the mechanism is set to properly effect reverse as will be presently apparent, lever 41 will be engaged toward the latter part of the movement of gear 11 so as to move rod 40 forwardly or to the left, thereby shifting clutch 17 forwardly to engage teeth 19 and 24 to lock out or render the automatic clutch C inoperative and the overrunning clutch D ineffective and providing a two-way drive between shafts 15 and 10. During the aforesaid movement of rod 40, spring 44 will be compressed so that on release or forward movement of gear 11, the parts will be restored to positions thereof illustrated provided, however, that other controls for the shiftable parts are positioned to accommodate such return movement as will be presently apparent.

In addition to the aforesaid manually operated means for shifting the position of clutch 17 in response to a setting of the reverse gearing of transmission B, as stated I have also provided a further manually controlled means for shifting the clutch 17, at times when permitted by my improved controlling means, independently of the movement thereof under the influence of the reverse setting of the transmission. To this end Bowden wire 50 as diagrammatically illustrated, extends for convenient manipulation by the vehicle driver, such position being indicated by the usual dash 51 which mounts a handle or knob 52 connected to the other end of the Bowden wire 50. The handle is adapted for movement by the hand of the vehicle driver, this handle being guided from its position illustrated to a position in spaced relationship from dash 51, in which position the guide portion 53 of the handle registers a notch 54 thereof with spring pressed ball 55 carried by a guide block 56.

The ball 55 and the notches 54 and 57 engageable therewith cooperate to advise the operator of the proper positioning of handle 52 for effecting the desired movement of the shifting arm 26 and clutch 17. In Fig. 1 it will be noted that the ball 55 is illustrated in engagement with the notch 57 and in this position spring 44 is acting to move clutch 17 rearwardly or to the position shown. In this position the teeth 19 are in engagement with the teeth 20 of the cylindrical member 21.

It will be noted that when handle 52 is pulled outwardly from dash 51, shifter arm 26 will move against pressure of spring 44 so as to shift the clutch 17 and move pins 47 forwardly, this shifting movement of the clutch 17 under actuation of handle 52 being independent of a similar clutch shifting movement under the influence of reverse gear 11. When the clutch 17 is shifted forwardly by engagement of notch 54 with ball 55, the clutch device will be maintained in the aforesaid shifted position until the handle 52 is restored to the position illustrated, whereupon spring 44 will act to restore the clutch to its illustrated position.

When clutch 17 is shifted forwardly by the aforesaid means to engage teeth 20 and 24, thus rendering the overrunning clutch ineffective, pins 47 are moved forwardly against the pressure of springs 49 to engage the pawl faces 48 and simultaneously prevent the pawls 28 from projecting outwardly, thus rendering the automatic clutch inoperative. When the clutch 17 is shifted rearwardly by the aforesaid means to the position illustrated, pins 47 are moved by the pressure of springs 49 to the position shown.

When clutch 17, pins 47, and the controls are as illustrated, the driving shaft drives the driven shaft 10 through the members 23 and 21 of the overrunning clutch D, the drive passing from cylindrical member 21 to the clutch 17, other conditions permitting such action, as will be presently apparent.

With clutch 17 in position as shown, the driving and driven shafts 15 and 10 respectively will be connected for a forward direct drive through cam 23, rollers 22, cylindrical member 21, and clutch 17 when the automatic clutch is disengaged. However, when the automatic clutch is engaged the drive between driving shaft 15 and driven shaft 10 will be accomplished with an overdrive action or increase in speed of the driven shaft over the driving shaft through cam 23, automatic clutch C, planet gears 36, cylindrical member 21, and clutch 17.

When the automatic clutch is engaged for the overdrive, it is impossible to shift clutch 17 forwardly or to the left of the position shown to attempt lock-out of the overrunning and automatic clutches for a direct drive, as pins 47 will strike side faces of clutch pawls 28.

What I claim is:

1. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, manually operable means for shifting said clutch device into a position providing said direct drive, and a control pin operably disposed between said clutch device and one of said clutching structures for releasably locking said manually operable means against operation to shift said clutch device into position tending to establish said direct drive when said clutching structures are engaged.

2. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, manually operable means for shifting said clutch device into a position providing said direct drive, and a control pin operably disposed between said clutch device and one of said clutching structures for releasably locking said clutching structures against relative clutching movement while said clutch device is in said position for providing said direct drive.

3. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, manually operable means for shifting said clutch device into a position providing said direct drive, manually controlled operating means for reversing the normal direction of drive of said drive shaft, and a control pin disposed between said clutch device and one of said clutching structures and adapted for operation in response to selective operation of said manually operable means and said manually controlled reversing means for rendering said clutching structures inoperative for said relative movement.

4. In a drive for a motor vehicle having a power driving shaft and a shaft driven therefrom and adapted to drive the vehicle, said driving and driven shafts being in axial alignment, overrunning clutch means intermed'ate said shafts for transmitting a releasable one-way direct drive therebetween, rotatable clutching structures one having a clutching element adapted to clutch with the other in response to substantially synchronized rotation of said clutching structures at or above a pre-determined speed to provide a releasable positive driving connection therebetween, means for driving one of said structures from said driving shaft, means for driving the other of said structures from said driven shaft, at least one of said driving means including a gear train adapted to drive its associated clutching structure at a speed different from that imparted to the other of said structures when said driving shaft drives said driven shaft through said overrunning clutch, said overrunning clutch being rendered inoperative in response to clutching of said structures, manually controlled clutch means shiftable relative to each of said clutching structures for locking out said overrunning clutch to provide a direct two-way drive between said driving and driven shafts, and a control pin operably disposed between said shiftable clutch means and said clutching element for locking said manually controlled clutch means against said shifting movement.

5. In a power transmission mechanism, a drive shaft, a driven shaft, clutch means drivingly connected to said shafts for transmitting a direct drive therebetween, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures being actuated in response to centrifugal force acting thereon into clutching engagement with the other of said clutching structures in response to substantially synchronized rotation of said clutching structures at or above a predetermined speed, a reciprocatory control pin disposed longitudinally adjacent one of said shafts between said direct drive clutch means and said centrifugal force actuated clutching structure to control the operation of the last said clutching structure relative to the operation of said direct driven clutch means, and a spring yieldingly urging said control pin in one direction of reciprocatory movement thereof.

6. In a power transmission mechanism, a drive shaft, a driven shaft, clutch means drivingly connected to said shafts for transmitting a direct drive therebetween, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures being actuated in response to centrifugal force acting thereon into clutching engagement with the other of said clutching structures in response to substantially synchronized rotation of said clutching structures at or above a predetermined speed, said clutch means being adapted to release said direct drive to facilitate synchronization of said clutching structures, and a control pin mounted for reciprocation in a direction parallel to the axis of one of said shafts and being disposed between said centrifugal force actuated clutching structure and a part of said direct drive clutch means to control the operation of the last said clutching structure relative to the operation of said clutch means.

7. In a motor vehicle drive, a driving shaft, a driven shaft aligned therewith, releasable direct drive means between the driving and driven shafts, said releasable direct drive means being so constructed and arranged as to permit relative movement between said shafts in response to a reduction in the speed of one of said shafts relative to the speed of the other of said shafts, supplemental driving means for driving the driven shaft from the driving shaft at a speed ratio different than said direct drive, said supplemental driving means including clutching means for controlling the drive therethrough, said clutching means including clutching members one of which is adapted for centrifugal force movement into engagement with the other, and means including an element movable relatively with respect to said shafts and clutching members into engagement with one of said clutching members for controlling the operation of said clutching means to prevent centrifugal force movement of said movable clutching member toward the other of said clutching members.

8. In a motor vehicle drive, an axially stationary driving shaft, an axially stationary driven shaft aligned therewith, overrunning-clutch direct-driving means between the driving and driven shafts, means for directly drivingly connecting said shafts independently of said overrunning clutch, supplemental driving means for driving the driven shaft from the driving shaft at a speed ratio different than said direct drive, said supplemental driving means including clutching means for controlling the drive therethrough, and latching means operably associated with said clutching means for preventing operation thereof in response to operation of said direct drive connecting means.

9. In a motor vehicle, a driving shaft aligned therewith, releasable direct drive means between the driving and driven shafts for accommodating relative movement therebetween, supplemental driving means for driving the driven shaft from the driving shaft at a speed ratio different than said direct drive, said supplemental driving means including clutching means operable in response to a predetermined speed of rotation of at least one of said shafts to automatically establish said speed ratio drive when said relative movement takes place between said shafts, said clutching means including relatively rotatable clutching members one of which is adapted for centrifugal force movement for engagement with the other when the speeds thereof are substantially synchronized, and means movable relative to said shafts and clutching members into a position of engagement with said centrifugal force clutching member for preventing movement thereof.

WILLIAM T. DUNN.

CERTIFICATE OF CORRECTION.

Patent No. 2,159,426. May 23, 1939.

WILLIAM T. DUNN.

It is hereby certified that error appears in the printed specification of the above numbered patent requiring correction as follows: Page 4, first column, line 16, claim 5, for the word "driven" read drive; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.

for driving connection with said shafts, said speed ratio driving means further including relatively movable clutching structures adapted when engaged to provide a drive through said gear train, one of said clutching structures being actuated in response to centrifugal force acting thereon into clutching engagement with the other of said clutching structures in response to substantially synchronized rotation of said clutching structures at or above a predetermined speed, a reciprocatory control pin disposed longitudinally adjacent one of said shafts between said direct drive clutch means and said centrifugal force actuated clutching structure to control the operation of the last said clutching structure relative to the operation of said direct driven clutch means, and a spring yieldingly urging said control pin in one direction of reciprocatory movement thereof.

6. In a power transmission mechanism, a drive shaft, a driven shaft, clutch means drivingly connected to said shafts for transmitting a direct drive therebetween, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures being actuated in response to centrifugal force acting thereon into clutching engagement with the other of said clutching structures in response to substantially synchronized rotation of said clutching structures at or above a predetermined speed, said clutch means being adapted to release said direct drive to facilitate synchronization of said clutching structures, and a control pin mounted for reciprocation in a direction parallel to the axis of one of said shafts and being disposed between said centrifugal force actuated clutching structure and a part of said direct drive clutch means to control the operation of the last said clutching structure relative to the operation of said clutch means.

7. In a motor vehicle drive, a driving shaft, a driven shaft aligned therewith, releasable direct drive means between the driving and driven shafts, said releasable direct drive means being so constructed and arranged as to permit relative movement between said shafts in response to a reduction in the speed of one of said shafts relative to the speed of the other of said shafts, supplemental driving means for driving the driven shaft from the driving shaft at a speed ratio different than said direct drive, said supplemental driving means including clutching means for controlling the drive therethrough, said clutching means including clutching members one of which is adapted for centrifugal force movement into engagement with the other, and means including an element movable relatively with respect to said shafts and clutching members into engagement with one of said clutching members for controlling the operation of said clutching means to prevent centrifugal force movement of said movable clutching member toward the other of said clutching members.

8. In a motor vehicle drive, an axially stationary driving shaft, an axially stationary driven shaft aligned therewith, overrunning-clutch direct-driving means between the driving and driven shafts, means for directly drivingly connecting said shafts independently of said overrunning clutch, supplemental driving means for driving the driven shaft from the driving shaft at a speed ratio different than said direct drive, said supplemental driving means including clutching means for controlling the drive therethrough, and latching means operably associated with said clutching means for preventing operation thereof in response to operation of said direct drive connecting means.

9. In a motor vehicle, a driving shaft aligned therewith, releasable direct drive means between the driving and driven shafts for accommodating relative movement therebetween, supplemental driving means for driving the driven shaft from the driving shaft at a speed ratio different than said direct drive, said supplemental driving means including clutching means operable in response to a predetermined speed of rotation of at least one of said shafts to automatically establish said speed ratio drive when said relative movement takes place between said shafts, said clutching means including relatively rotatable clutching members one of which is adapted for centrifugal force movement for engagement with the other when the speeds thereof are substantially synchronized, and means movable relative to said shafts and clutching members into a position of engagement with said centrifugal force clutching member for preventing movement thereof.

WILLIAM T. DUNN.

CERTIFICATE OF CORRECTION.

Patent No. 2,159,426. May 23, 1939.

WILLIAM T. DUNN.

It is hereby certified that error appears in the printed specification of the above numbered patent requiring correction as follows: Page 4, first column, line 16, claim 5, for the word "driven" read drive; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.